F. L. O. WADSWORTH.
MANUFACTURE OF PLATE GLASS.
APPLICATION FILED JULY 14, 1905.

952,390.

Patented Mar. 15, 1910.
2 SHEETS—SHEET 1.

WITNESSES
Thomas W. Bardell
Warren W. Swartz

INVENTOR
Frank L. O. Wadsworth

F. L. O. WADSWORTH.
MANUFACTURE OF PLATE GLASS.
APPLICATION FILED JULY 14, 1905.
952,390.
Patented Mar. 15, 1910.
2 SHEETS—SHEET 2.
Fig. 5.
Fig. 7.
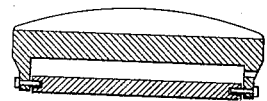
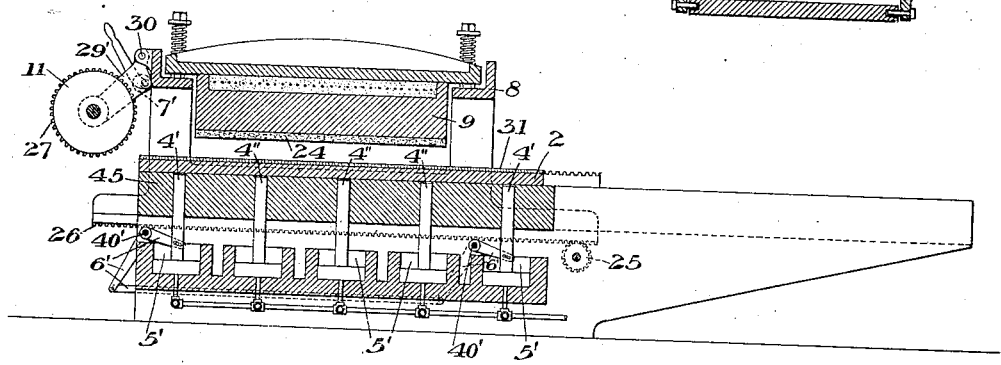
Fig. 6.
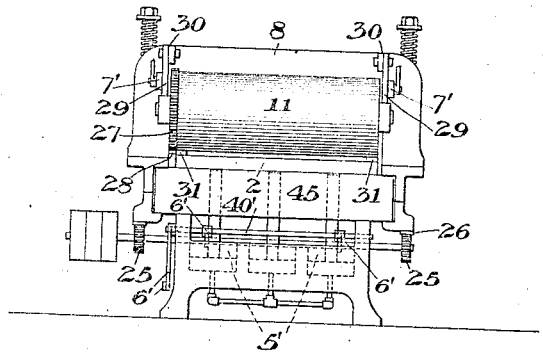
WITNESSES
Warren W. Swartz
R. A. Balderson
INVENTOR
Frank L. O. Wadsworth

UNITED STATES PATENT OFFICE.

FRANK L. O. WADSWORTH, OF MORGANTOWN, WEST VIRGINIA, ASSIGNOR TO PRESSED PRISM PLATE GLASS COMPANY, OF NEW YORK, N. Y., A CORPORATION OF WEST VIRGINIA.

MANUFACTURE OF PLATE-GLASS.

952,390.   Specification of Letters Patent.   Patented Mar. 15, 1910.

Application filed July 14, 1905. Serial No. 269,625.

*To all whom it may concern:*

Be it known that I, FRANK L. O. WADSWORTH, of Morgantown, Monongalia county, West Virginia, have invented a new and useful Improvement in the Manufacture of Plate-Glass, of which the following is a full, clear, and exact description, reference being had to the accompanying drawings, forming part of this specification, in which—

Figure 1:
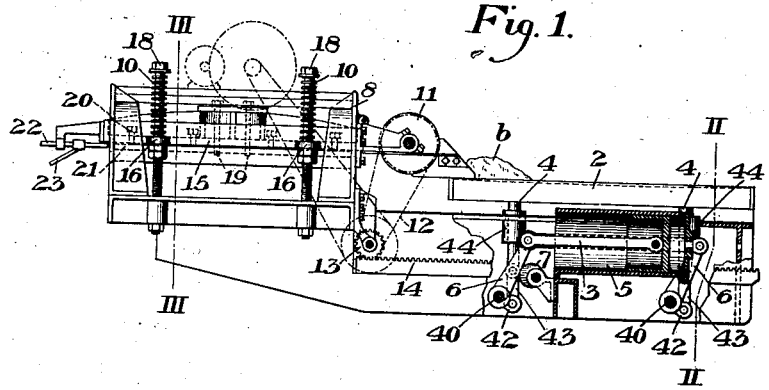
Figure 2:
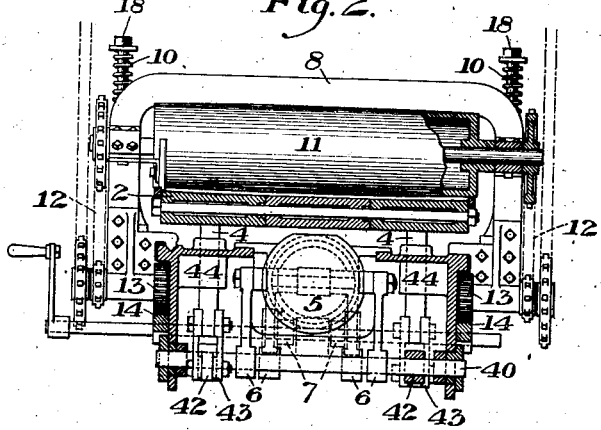
Figure 3:
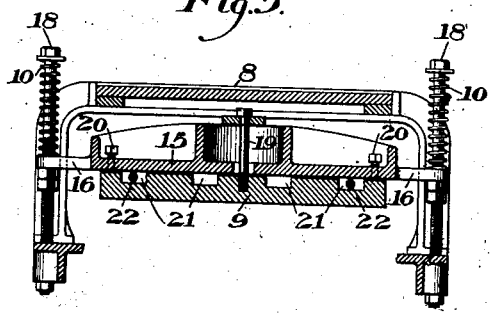
Figure 4:
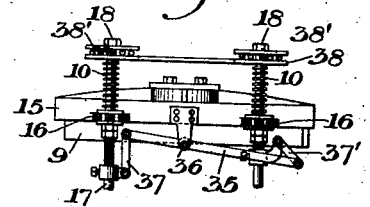

Figure 1 is a side elevation of a machine adapted for practice of my invention; Fig. 2 is a vertical cross-section on the line II—II of Fig. 1; Fig. 3 is a vertical cross-section on the line III—III of Fig. 1; Fig. 4 represents means which I employ for imparting to the die a slight oscillatory motion during the operation of pressing; Fig. 5 represents a longitudinal central section of a modified form of apparatus for the practice of my invention; Fig. 6 an end view of the same; and Fig. 7 is another modification.

In the manufacture of plate glass as ordinarily practiced, a body of plastic glass is rolled into sheet form on an iron table, and after annealing is ground and polished. The quality of the plate can be improved by pressing its surface with a die after the glass has been rolled and before it has become chilled and set. Such pressing will compact the glass, render it dense, and diminish the size of any bubbles or cavities that it may contain, and by giving to the sides of the sheet truer plane surfaces than can be imparted by rolling, it lessens greatly the amount of grinding which must be done in the final stage of the manufacture, and enables good plates of quality sufficient for many purposes to be obtained without grinding and polishing the upper surface. Notwithstanding these important advantages, the pressing of rolled glass plates having plain surfaces was not practicable prior to my invention, because of certain difficulties, the cause of which I have discovered to be attributable partly to the fact that a hot body of molten glass when placed on the rolling table heats and distorts different portions of the table and of the machine very unequally and thereby prevents the proper action of the pressing die over the entire surface of the rolled sheet, and attributable also to the fact that a flat pressing die when brought in sudden contact with the hot glass sheet, will chill and injure the surface of the sheet unless the die is made and used in such manner as to prevent the rapid abstraction of heat from the glass during the operation of pressing. Having discovered the causes of these difficulties I have invented means by which they can be effectually prevented as follows:—Instead of making the surfaces of the rolling table and die flat rigid surfaces as heretofore, I make one or both of them concave, so that when these parts on which the glass is supported and pressed are expanded by heat and are at their normal working temperature, they will present substantially even parallel surfaces which will come into practically simultaneous contact with the entire extent of the sheet to be pressed. It is only under these circumstances that the surfaces of a freshly rolled glass sheet can be properly pressed and finished, because the material of which such a sheet is composed is so viscous and offers such a resistance to edgewise flow that it is impossible to alter to any extent the longitudinal distribution of the metal in the sheet. The degree of concavity which it is necessary to give to the table or the die surfaces will vary somewhat with the relative size of the various parts of the machine and the temperature at which the glass is worked. With a table 60×90 inches the degree of concavity required in operating on glass at normal working temperature is about one-fourth of an inch when the table is cold. To secure the proper finish and polish of the pressed surfaces and to prevent cracking and "checking," I employ a die whose surface is of such nature as to prevent any rapid abstraction of heat from the rolled sheet during the operation of pressing. This result may be secured either by heating the die to a temperature nearly equal to that of the semimolten glass sheet or by making the surface of the die of a non-conducting and highly polished nature, or by a combination of both of these means.

The drawing shows means well suited to the practice of my invention, but the apparatus may be modified in many other ways.

In the drawings of Figs. 1, 2 and 3, 2 is a table on which the body of plastic glass *b* to be molded is placed. This table is mounted upon standards 4, adapted to be moved vertically, preferably by a piston working in a cylinder 5, and intermediate connecting mechanism consisting of a pitman 3 connected by levers 6, 6 to shafts 40, which by levers 42 and links 43 are in turn connected to the standards 4, which slide vertically in bearings 44 and communicate to the table its vertical motion. The cylinder is provided with suitable fluid-supply connections, the rise of the table being effected by the admission of fluid and its descent being effected by gravity. The position of the table when at its lowest point is determined by an adjustable stop consisting, preferably, of an eccentric 7, which is adapted to be engaged by and to stop part of the connecting mechanism 6.

8 is a carriage on which is mounted a spreading roll 11 and a heavy press or backing plate 15 to which is attached a die plate 9. The backing plate is provided with four lugs 16, which rest on adjustable nuts on the standards 17 and are backed yieldingly by springs 10 whereby tension can be adjusted by nuts 18. The die plate is attached to and adjustable with respect to the carriage by bolts 19 and set-screws 20. Means are provided by which the die and backing plate can be artificially heated to a high initial temperature, and in the apparatus shown in Figs. 1 to 3 this is accomplished preferably by providing a series of combustion chambers 21 between the back of the die and the plate 15 into which gas and air are introduced by means of pipes 22, 23. Instead of this means of heating the die, I may employ others such for example as those shown in Fig. 5, in which a network of electric wires are shown embedded in a non-conducting mass of material in the back of the die-plate, or in any other approved manner. The purpose of heating the die is to prevent the too rapid transfer of heat from the glass to the die where the sheet of glass is being pressed. This result may be secured without such high initial heating by facing the die, as in Fig. 5, with a non-conducting material or composition 24.

The spreading carriage is capable of longitudinal motion in order to move the spreading roll over the table and bring the backing plate and die over the surface of the rolled-out sheet of glass. For this purpose I may employ the mechanism shown in Figs. 1 and 2, in which positively driven carriage pinions 13 engage with stationary racks 14, the spreading roller being driven at the same circumferential speed by chain connections 12, or as in Fig. 5, I may employ positively driven stationary pinions 25 engaging with racks 26 on the carriage 8. In this case the roller is revolved as it passes over the surface of the table by means of a gear 27 at one end engaging with a rack 28 on the side of the table 2. The spreading roll 11 is not rigidly bolted to the carriage 8, but is mounted in swinging hangers which are pivotally connected to the carriage 8 by hinged joints at 30. The roll is guided in its motion along the table and kept at a definite and predetermined distance above the surface of the same by means of trangs or side strips 31 attached to the table.

In the construction shown in Figs. 1 and 2, the surface of the table 2 is concaved or hollowed out at the center. The surface of the roll is similarly convex in longitudinal section, so that at the normal working temperature of the table, i. e., the temperature of the table just before the glass is rolled, the surfaces of roller and table are substantially parallel. In the apparatus shown in Figs. 5 and 6, both table and roller may be flat and straight, or one concave and the other convex as shown in Fig. 2. In either case the object is to keep the surface of the table and the lower edge of the roller parallel so as to roll out a sheet of glass of uniform thickness.

In Fig. 4 of the drawings I show means which I may employ for imparting to the die a slight to and fro motion in the plane of the glass sheet while it is being pressed. 35 is a lever pivotally connected to the backing plate at 36 and connected by links 37, 37′ to fixed lugs on the standards 17, 17. When an upward pressure and motion is imparted to the backing plate and die by the vertically moving table 2, the lever and links impart to the plate and die an edgewise to and fro motion over the sheet, and as the plate and die move down again under gravity and the action of the springs 10, a reverse motion results. The edgewise motion of the plate is permitted by slotting the lugs 16, through which the standards pass and it is facilitated by placing steel balls or rollers between the washers 38, 38′ inserted between the springs 10 and the adjusting nuts 18 on the top of the standards. Other equivalent devices may be employed for giving an edgewise motion to the die, the object of this edgewise motion being to secure more perfect pressing contact between the surfaces of the sheet and smoothing out irregularities and defects that might escape the action of a direct up and down pressing action.

In the apparatus shown in Figs. 5 and 6, I employ for moving the table a multiplicity of cylinders 5′, 5′, the pistons of which are attached directly to the standards 4′, 4′, 4″, 4″. These standards slide through bearings in a heavy iron base plate 45 the top of which is planed flat and serves as a support for the rolling table 2 when the latter is in its lowest position. The four corner standards are connected together by links and levers 6′, 6′ on shafts 40′, so as to move together, the other intermediate standards 4″, 4″ and pistons may move independently. In this form of apparatus the rolling table is relatively thin and sufficiently elastic to bend under the separate pressure of the standards 4′, 4″. The eccentric 7′ which regulates the relative separation of the table 2 and roller 11 is in this case mounted in the hangers 29′ in which the roller 11 is mounted.

The operation is as follows: The eccentric 7′ is moved until the roll rests upon the side strips 31, which are adjusted to produce a sheet of the required thickness. The carriage 8 is moved back until the roll is at one end of the table, as in Fig. 1, and a mass of plastic glass 9 is placed thereon just in front of the roller. The carriage 8 is then advanced so as to move the roll 11 forward over the glass and spread it down on the table in a sheet of uniform thickness, the result being secured by forming the table and roll as already described. A further advance of the carriage moves the roll beyond the front end of the table, as in Fig. 5, and brings the die 9 over the sheet of rolled glass. In the meantime the hot sheet of glass has heated the upper surface of the table 2 and caused it to bow upward to such an extent that the top surface of the table and sheet are now parallel with the surface of the pressing die. Then by admitting fluid to the cylinder 5 or cylinders 5′ the table is raised and the surface of the rolled glass sheet is brought into contact with the polished heated surface of the die 9 and by pressure thereon is flattened, compacted and given a true and highly polished surface. The table is then lowered and the eccentric 7′ turned until the roller and table are separated sufficiently to enable the carriage 8 to be retracted without the roller touching the finished pressed surface of the sheet and the latter is removed and placed in the kiln or annealing oven in the usual manner.

In order to secure the best results the surface of the rolled glass sheet must be brought into substantially simultaneous contact with the entire surface of the pressing die. To provide for this when the whole machine has reached its working temperature, I adjust the nuts 18 and the bolts and set-screws 19 and 20 after the machine has reached the normal working temperature already referred to, until the surface of the die and table are as nearly as possible parallel, before the glass sheet is rolled out. A further automatic adjustment of the die and table to parallelism is accomplished by means of the yielding springs and lever mechanism 35, 37, which permits the die to bed or seat itself on the surface on the sheet before any great amount of pressure is communicated to it by the compression of the springs 10, 10, under the action of the fluid pressure in the cylinders 5. Finally the effect of the unequal heating of the surface of the table during the rolling of the sheet and the consequent bowing of the latter in its center relatively to its corners, is compensated and eliminated as already explained either by making the surface of the table concave as in Figs. 1 and 2, or by making the table sufficiently thin as in Figs. 5 and 6, to spring to the surface of the die under the independent action of the corner standards 4′, 4′ and the intermediate standards 4″, 4″.

Instead of using a thin table which will bend under the pressing action of the standards so as to make the top surface of the glass sheet conform to the entire surface of the die, I may use a very thin flexible die surface as shown in Fig. 7, which is hung in a cavity in the backing plate, by pins, so as to bend readily when the sheet is pressed against it and conform itself to the upper surface thereof. In such case the lower table is made thick and rigid as in Figs. 1 and 2, but need not be made concave, as the bowing of the table under the heating action of the rolled sheet is compensated for by the bending of the top flexible die during the subsequent pressing operation. The die of Fig. 7 is kept hot by burning gas and air in the cavity between it and the backing plate, or by inserting an electric heater therein or by any other suitable means.

Many other forms of mechanism and various other means of operation may be employed to accomplish the results herein set forth, since

What I claim is:—

1. The herein described improvement in the art of making plate glass, which consists in subjecting a free surface of a newly formed and still plastic glass plate to pressure and preventing any substantial transfer of heat therefrom to the pressing element, substantially as and for the purpose set forth.

2. The herein described improvement in the art of making plate glass, which consists in applying pressure to a free surface of a newly formed and still plastic glass plate with said free surface and the face of the pressing element in substantial parallelism, substantially as and for the purpose set forth.

3. The herein described improvement in the art of making plate glass, which consists in applying pressure to a free surface of a newly formed and still plastic glass plate with said free surface and the face of the pressing element in substantial parallelism and preventing any substantial transfer of heat from the plate to the pressing element, substantially as and for the purpose set forth.

4. The process of finishing a plate of glass consisting in subjecting all parts of the free surface of the already formed and still plastic plate to substantially uniform, simultaneous and momentary pressure, substantially as and for the purpose set forth.

5. The process of finishing a plate of glass consisting in subjecting all parts of the free surface of the already formed and still plastic plate to substantially uniform, simultaneous and momentary pressure, and retarding the transfer of heat from the plate to the pressure applying member, substantially as and for the purpose set forth.

6. The herein described method, of making glass plates which consists in supporting a newly formed and still plastic plate of glass upon a table, and then applying pressure to that portion of the exposed or free part of the plate to be shaped while plastic, and during the pressing operation preventing any substantial transfer of heat from said free or exposed surface of the plate to the pressing element in contact therewith, substantially as and for the purpose set forth.

7. The herein described method, of making glass plates which consists in supporting a newly formed and still plastic plate of glass upon a table, and then applying pressure to the free or exposed surface thereof throughout the area to be shaped with the free or exposed surface of the glass and the face of the pressing element in substantial parallelism, substantially as and for the purpose set forth.

8. The herein described method of making glass plates, which consists in first spreading molten glass on a supporting surface having an initial contour different from that of the surface to be imparted to the glass, and utilizing the heat of the glass to change the contour of such surface to the desired form, and then applying pressure to the sheet and maintaining the forming surface of the pressure-applying device in parallelism with the surface of the previously formed sheet during the pressing operation; substantially as described.

9. The herein described method of making glass plates, which consists in first spreading molten glass upon a supporting surface having an initial contour different from that of the surface to be imparted to the glass, utilizing the heat of the glass to change the contour of such surface to the desired form, pressing the glass by pressure applied to the glass throughout substantially its entire cross-section, and maintaining the forming surface of the pressure applying device in parallelism with the surface assumed by the sheet at the conclusion of the spreading operation; substantially as described.

10. The herein described method of making glass plates, which consists in spreading molten glass into sheet form on a surface which when cold is concave, utilizing the heat from the glass to expand such surface to a plane form, and then pressing the glass and maintaining the forming surface of the pressure-applying surface in parallelism with the surface assumed by the glass at the completion of the spreading operation, substantially as described.

11. The herein described method, of making glass plates which consists in supporting a newly formed and still plastic plate of glass, and then applying pressure to that portion of the exposed or free part of the plate to be shaped, and applying external heat to the pressing element sufficient to prevent any substantial transfer of heat from said free or exposed surface of the plate to the pressing element in contact therewith during the pressing operation, substantially as and for the purpose set forth.

12. The method hereindescribed of making glass plates, which consists in spreading molten glass into sheet form on a metal surface which when cold is concave, utilizing the heat from the glass to expand said surface to a plane form, pressing the glass thereon over its entire area, and maintaining the temperature of the pressure applying medium sufficiently high to prevent transfer of heat thereto from the glass; substantially as described.

13. The method herein described of making glass plates, which consists in spreading molten glass into sheet form on a concave surface of continuous curvature, and shaping the glass on said surface so that its upper and lower surfaces will be substantially parallel, and then pressing the glass between pressing elements which are in substantial parallelism with the respective faces of glass; substantially as described.

14. The method herein described of making glass plates, which consists in spreading molten glass on a concave forming surface of continuous curvature, and then pressing the glass with a die, acting simultaneously throughout the area of the glass to be pressed and imparting to said die a temperature about equal to that of the glass sheet to be pressed; substantially as described.

15. The method herein described of making glass plates, which consists in spreading molten glass into sheet form, then pressing it and imparting to the pressing surface motion in the plane of the sheet; substantially as described.

16. The method herein described of making glass plates, which consists in spreading molten glass into sheet form, then pressing it and imparting to the pressing surface reciprocating motion in the plane of the sheet; substantially as described.

17. In the manufacture of glass sheets, the method which consists in first spreading molten glass into sheet form of at least the dimensions of the finished sheet, then applying pressure simultaneously over the entire area of the sheet, and maintaining the forming surface of the pressing device substantially parallel with the surface of the previously formed sheet during the pressing operation; substantially as described.

18. In apparatus for forming plate glass, a forming surface, means for spreading the glass thereon, and a pressing die arranged to apply pressure substantially simultaneously to the entire surface of the spread sheet, said die having means for preventing any substantial transfer of heat from the glass to the die during the pressing operation; substantially as described.

19. In apparatus for forming plate glass, a table having a forming surface, a coöperating spreading device, and a pressing element having a forming surface, the centers of the continuous curvature of the two surfaces being both located on the same side of their common plane; substantially as described.

20. In apparatus for forming plate glass, a supporting surface, means for spreading molten glass into sheet form thereon, a pressing die, and means for maintaining the forming surface of the pressing die in parallelism with the surface of the spread glass sheet; substantially as described.

21. In apparatus for forming plate glass, a supporting surface, means for spreading molten glass thereon into sheet form, a pressing die having a forming surface, and means for bending one of said surfaces to maintain parallelism between the surface of the spread sheet and the surface of the die; substantially as described.

22. In apparatus for forming plate glass, a supporting surface, means for spreading molten glass thereon into sheet form, a pressing die, and means for bending said die to change its forming surface; substantially as described.

23. In apparatus for making glass plates, a supporting surface, means for spreading molten glass thereon in sheet form, a pressing die, and means for imparting motion to said die in the plane of the sheet; substantially as described.

24. In apparatus for making glass plates, a supporting surface, means for spreading molten glass thereon in sheet form, a pressing die, and means for imparting reciprocating motion to said die in the plane of the sheet; substantially as described.

25. An apparatus for making glass plates having means for first forming molten glass into a plate by a spreading operation, and other means for applying pressure to the exposed or free surface of the plate substantially simultaneously throughout its entire area and preventing any substantial transfer of heat therefrom to the pressing element during the pressing operation, substantially as and for the purpose set forth.

26. An apparatus for making glass plates having means for forming a mass of molten glass into a plate, and other means for applying pressure to the free or exposed surface of the plate throughout the area to be shaped and means for maintaining said surface and the face of the pressing element in substantial parallelism, substantially as and for the purpose set forth.

27. An apparatus for making glass plates having means for forming a mass of molten glass into a plate, other means for applying pressure to the free or exposed surface of the plate means to maintain said surface and the face of the pressing element in substantial parallelism, and means to prevent any substantial transfer of heat from the free surface of the plate to the pressing element, substantially as and for the purpose set forth.

In testimony whereof, I have hereunto set my hand.

FRANK L. O. WADSWORTH.

Witnesses:
 JOHN MILLER,
 H. M. CORWIN.